Jan. 2, 1951 — C. T. ASHBY — 2,536,342
GAS HEAT EXCHANGER AND CONDENSATE PRECOOLER
Filed Dec. 8, 1947

INVENTOR.
Carl T. Ashby
BY
ATTORNEY

Patented Jan. 2, 1951

2,536,342

UNITED STATES PATENT OFFICE 2,536,342

GAS HEAT EXCHANGER AND CONDENSATE PRECOOLER

Carl T. Ashby, Evansville, Ind., assignor to Servel, Inc., New York, N. Y., a corporation of Delaware Application December 8, 1947, Serial No. 790,342

3 Claims. (Cl. 62—119.5)

1

This invention relates to refrigeration and particularly to absorption refrigerating systems of the uniform pressure type.

It is an object of this invention to provide an improved means for precooling liquid refrigerant en route from the condenser to the evaporator of an absorption refrigerating system.

The above and other objects and advantages will be more clearly understood from the following detailed description taken in connection with the accompanying drawing, wherein.

Figures 1, 2:
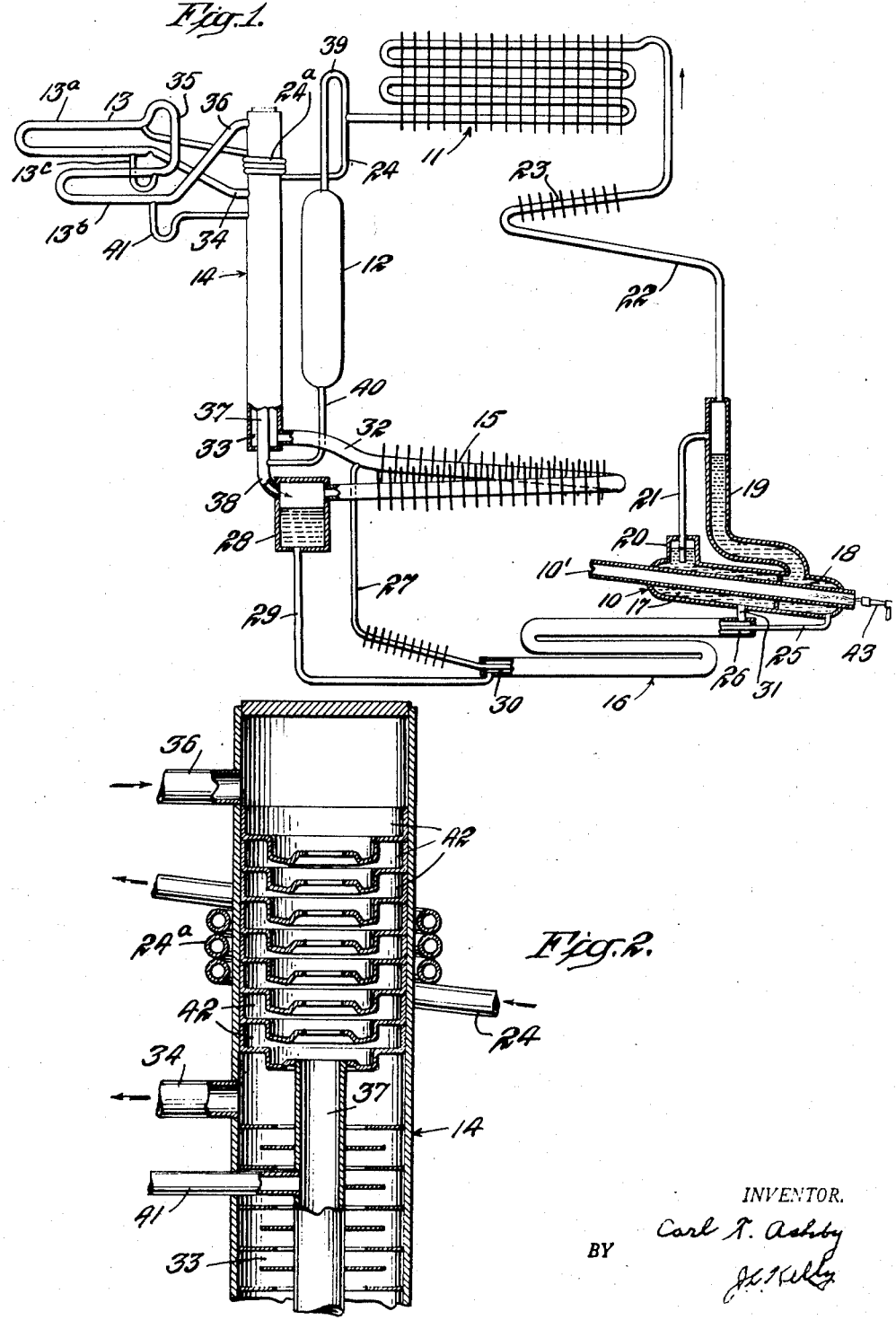
Fig. 1 is a view diagrammatically illustrating a refrigerating system incorporating my invention.
Fig. 2 is a detailed sectional view of a specific arrangement of a precooler in accordance with my invention.

For purposes of illustration, I have incorporated my invention in an absorption refrigerating system of the uniform pressure type, which system includes generally a generator 10, a condenser 11, a pressure vessel 12, an evaporator 13, a gas heat exchanger 14, an absorber 15, a liquid heat exchanger 16 and conduits interconnecting said elements for flow of a refrigerating medium, an absorption solution and a pressure-equalizing gas. The system may be charged, for example, with a refrigerant-absorbent solution, such as ammonia and water, and with hydrogen as the inert pressure-equalizing gas.

The generator 10 includes a substantially horizontal shell divided into a rich solution chamber 17, a weak solution chamber 18 and provided with a flue 10' which passes through the two chambers. A standpipe 19 opens into and projects upwardly from the weak solution chamber. The strong solution chamber 17 is provided with a dome 20. A riser or vapor-lift conduit 21 projects into the dome 20 and has the opposite end thereof connected to the upper portion of the standpipe 19. A conduit 22, provided with an air cooled rectifier 23, connects the upper part of standpipe 19 with the upper or inlet end of the condenser 11. The outlet end of the condenser is connected by a conduit 24 to a low-temperature section 13ª of the evaporator.

Weak solution chamber 18 of the generator is connected by conduit 25, an inner passage 26 of liquid heat exchanger 16, and a conduit 27 to the upper part of the absorber 15. The lower part of the absorber is connected by an absorber vessel 28, a conduit 29, an outer passage 30 of the liquid heat exchanger, and a conduit 31 to the rich solution chamber 17 of the generator.

The upper part of the absorber is connected

2 by a conduit 32, an outer passage 33 of gas heat exchanger 14, and a conduit 34 to the gas inlet end of low-temperature section 13ª of the evaporator. The gas outlet end of the low-temperature section of the evaporator is connected by a conduit 35 to a high-temperature section 13ᵇ of the evaporator, and the gas outlet end of the high-temperature section of the evaporator is connected by a conduit 36, an inner passage 37 of the gas heat exchanger, a conduit 38, and absorber vessel 28 to the lower part of the absorber. Pressure vessel 12 is connected at its upper end to conduit 24 by a conduit 39, and at its lower end the pressure vessel is connected to conduit 38 by a conduit 40. A drain conduit 41 leads from the outlet of evaporator section 13ᵇ to the inner passage of the gas heat exchanger.

In accordance with this invention, and as shown more clearly in Fig. 2, the conduit 24, which delivers liquid refrigerant from the condenser to low-temperature section 13ª of the evaporator, is provided with a coiled portion 24ª that is wound around and placed in good thermal contact with the upper part of the gas heat exchanger 14. The upper part of the gas heat exchanger is provided with a plurality of perforated discs 42 which are arranged to provide a large heat transfer surface between the rich inert gas flowing through the gas heat exchanger and the liquid refrigerant flowing through the coil 24ª.

With heat applied to the generator flue, as by a gas burner 43, refrigerant vapor is expelled from solution in the weak solution chamber 18 of the generator, which expelled vapor flows upwardly through the standpipe to the upper portion thereof. Refrigerant vapor is also expelled from solution in the rich solution chamber 17 which vapor collects in the dome 20 and passes therefrom through vapor-lift conduit 21 lifting absorption solution from the rich solution chamber into the standpipe. The expelled vapor flows from the upper part of the standpipe through conduit 22 and rectifier 23 into the condenser 11 wherein the refrigerant vapor is liquefied. The liquid refrigerant formed in the condenser flows through conduit 24 and coil 24ª into a low-temperature section 13ª of the evaporator wherein the liquid refrigerant flows counterflow to weak inert gas that flows from conduit 34 through the evaporator, whereby the refrigerant evaporates and diffuses into the inert gas to produce a refrigerating effect.

The partially enriched inert gas flows from the low-temperature section of the evaporator through conduit 35 into the high-temperature section 13$^b$ wherein this partially enriched gas flows concurrently with liquid refrigerant that flows from the low to the high temperature section of the evaporator through drain conduit 13$^c$. The enriched mixture of inert gas and refrigerant vapor flows from the high-temperature section of the evaporator through conduit 36 into the upper part of the gas heat exchanger wherein this cold rich mixture of refrigerant vapor and inert gas picks up heat from the perforated discs 42 which discs in turn pick up heat from the liquid refrigerant flowing through coil 24$^a$, whereby the liquid refrigerant is precooled before entering the low-temperature section of the evaporator. The enriched inert gas then flows through the inner passage 37 of the gas heat exchanger and conduit 38 into absorber vessel 28, and from there the inert gas flows upwardly through the absorber 15.

Absorption solution weak in refrigerant flows from conduit 27 into the upper part of the absorber, whereby the absorption solution absorbs the refrigerant vapor from the rich inert gas, and the inert gas stripped of refrigerant vapor flows from the upper part of the absorber through conduit 32, outer passage 33 of the gas heat exchanger, and conduit 34 back to the low-temperature section of the evaporator.

The enriched absorption solution flows from the lower end of the absorber into absorber vessel 28, and from there the enriched absorption solution flows through conduit 29, outer passage 30 of the liquid heat exchanger, and conduit 31 into the strong solution chamber 17 of the generator. The absorption solution is lifted from the strong solution chamber of the generator by vapor-lift pump 21 into the standpipe 19, from whence this solution flows into the weak solution chamber 18 of the generator. The weak solution flows from chamber 18 through conduit 25, inner passage 26 of the liquid heat exchanger, and conduit 27 back to the upper part of the absorber.

As shown particularly in Fig. 2, the weak inert gas is withdrawn from the gas heat exchanger through conduit 34 at a point below that at which the coil 24$^a$ is wrapped around the inlet or enlarged portion of the rich inert gas passage of the heat exchanger. With this arrangement the liquid refrigerant passing through coil 24$^a$ en route to the evaporator is precooled by the relatively cold rich inert gas before such gas passes in heat exchange relation with the relatively warm weak inert gas, thereby assuring ample precooling of the liquid refrigerant before such refrigerant enters the evaporator.

Having thus disclosed my invention I wish it understood that I do not desire to be limited to the specific structure illustrated and described, for obvious modifications may occur to persons skilled in the art.

What is claimed is:

1. In an absorption refrigerating system of the continuous cycle inert gas type, a tubular casing having in one end a chamber communicating with one end of a conduit located within said casing and forming therewith a heat exchanger, an inlet for gas to said chamber, an outlet for gas from the other end of said conduit, an inlet for gas to said casing adjacent the outlet end of said conduit, an outlet for gas from said casing adjacent said chamber, and a conduit for liquid arranged in thermal contact with said casing exterior of said chamber.

2. Structure as set forth in claim 1 in which said conduit for liquid is a pipe coil.

3. Structure as set forth in claim 1 in which said chamber has interior heat transfer fins.

CARL T. ASHBY.

REFERENCES CITED

The following references are of record in the file of this patent:

UNITED STATES PATENTS

| Number | Name | Date |
| --- | --- | --- |
| 2,181,528 | Widell | Nov. 28, 1939 |
| 2,321,113 | Taylor | June 8, 1943 |